(12) United States Patent
Yacoub (10) Patent No.: US 9,452,752 B2
(45) Date of Patent: *Sep. 27, 2016

(54) METHOD FOR INITIATING AND MAINTAINING A SUBSTOICHIOMETRIC OPERATING MODE OF AN INTERNAL COMBUSTION ENGINE AND INTERNAL COMBUSTION ENGINE FOR CARRYING OUT A METHOD OF THIS KIND

(71) Applicant: Ford Global Technologies, LLC, Dearborn, MI (US)

(72) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/704,659

(22) Filed: May 5, 2015

(65) Prior Publication Data

US 2015/0232085 A1   Aug. 20, 2015

Related U.S. Application Data

(63) Continuation of application No. 13/760,995, filed on Feb. 6, 2013, now Pat. No. 9,021,786.

(30) Foreign Application Priority Data

Feb. 22, 2012   (DE) .................. 10 2012 202 679

(51) Int. Cl.
*F01N 3/00*   (2006.01)
*B60W 20/00*   (2016.01)
(Continued)

(52) U.S. Cl.
CPC .......... *B60W 20/1082* (2013.01); *B60W 10/06* (2013.01); *B60W 10/08* (2013.01);
(Continued)

(58) Field of Classification Search
CPC ............. F02D 41/0275; F02D 41/114; F02D 41/0295; F02D 41/029; F01N 13/02; F01N 9/002; F01N 3/035
USPC .................. 60/273, 274, 285, 286, 301, 295
See application file for complete search history.

(56) References Cited

U.S. PATENT DOCUMENTS 6,009,965 A * 1/2000 Takanohashi .......... B60K 6/485
                                                      180/65.26
6,079,204 A * 6/2000 Sun ........................ B60K 6/485
                                                      180/165
(Continued)

FOREIGN PATENT DOCUMENTS

DE       19953480 A1 *  5/2001   ......... B01D 53/9481
EP        1936140 A1    6/2008
(Continued)

*Primary Examiner* — Patrick Maines
(74) *Attorney, Agent, or Firm* — Julia Voutyras; Alleman Hall McCoy Russell & Tuttle LLP (57) ABSTRACT

The present disclosure describes systems and methods for recharging a storage catalyst of an internal combustion engine. A method is described, comprising: while operating an engine in a substoichiometric operating mode when the engine is under medium load and responsive to an LNT condition, assisting the engine with an electric machine connected to an engine crankshaft. The electric machine provides an auxiliary drive to assist the engine in maintaining the substantially steady state substoichiometric operating mode which may be used to reduce $NO_x$ or $SO_x$ build up in a storage catalytic convertor or to assay the condition of a storage catalytic convertor.

13 Claims, 3 Drawing Sheets (51) Int. Cl.
*F02D 41/04* (2006.01)
*F02D 41/30* (2006.01)
*F01N 3/20* (2006.01)
*F02D 41/02* (2006.01)
*B60W 10/06* (2006.01)
*B60W 10/08* (2006.01)

(52) U.S. Cl.
CPC ........... *F01N 3/20* (2013.01); *F02D 41/0275* (2013.01); *F02D 41/04* (2013.01); *F02D 41/3076* (2013.01); *Y10S 903/93* (2013.01); *Y10T 477/23* (2015.01)

(56) References Cited

U.S. PATENT DOCUMENTS

| | | | | | |
|---|---|---|---|---|---|
| 6,109,025 | A | * | 8/2000 | Murata | B60K 6/24 123/568.19 |
| 6,129,075 | A | * | 10/2000 | Murata | B60K 6/24 123/568.21 |
| 6,722,125 | B1 | * | 4/2004 | Pfalzgraf | F01N 3/0814 60/274 |
| 2001/0037905 | A1 | * | 11/2001 | Nogi | B60K 6/445 180/65.235 |
| 2002/0038654 | A1 | * | 4/2002 | Sasaki | B60K 6/485 123/568.11 |
| 2006/0064969 | A1 | * | 3/2006 | Yoshida | B01D 53/9431 60/286 |
| 2006/0156710 | A1 | * | 7/2006 | Pott | B60K 6/48 60/285 |
| 2009/0025369 | A1 | * | 1/2009 | Yoshida | F01N 13/0097 60/285 |
| 2011/0047970 | A1 | * | 3/2011 | Yezerets | F01N 3/0842 60/274 |

FOREIGN PATENT DOCUMENTS

| | | | | |
|---|---|---|---|---|
| FR | 2784626 | A1 * | 4/2000 | B60K 6/485 |
| WO | 2008003551 | A1 | 10/2008 | |

\* cited by examiner

METHOD FOR INITIATING AND MAINTAINING A SUBSTOICHIOMETRIC OPERATING MODE OF AN INTERNAL COMBUSTION ENGINE AND INTERNAL COMBUSTION ENGINE FOR CARRYING OUT A METHOD OF THIS KIND

CROSS REFERENCE TO RELATED APPLICATIONS

The present application is a continuation of U.S. patent application Ser. No. 13/760,995, entitled "METHOD FOR INITIATING AND MAINTAINING A SUBSTOICHIOMETRIC OPERATING MODE OF AN INTERNAL COMBUSTION ENGINE AND INTERNAL COMBUSTION ENGINE FOR CARRYING OUT A METHOD OF THIS KIND," filed on Feb. 6, 2013, now U.S. Pat. No. 9,021,786, which claims priority to German Patent Application No. 102012202679.7, entitled "METHOD FOR INITIATING AND MAINTAINING A SUBSTOICHIOMETRIC OPERATING MODE OF AN INTERNAL COMBUSTION ENGINE AND INTERNAL COMBUSTION ENGINE FOR CARRYING OUT A METHOD OF THIS KIND," filed on Feb. 22, 2012, the entire contents of each of which are hereby incorporated by reference for all purposes.

TECHNICAL FIELD

The present application relates to exhaust gas discharge for internal combustion engines.

BACKGROUND AND SUMMARY

Normally and in the context of the present disclosure, the air ratio $\lambda$ is defined as the ratio of the air mass $m_{Air,actual}$ actually fed to the at least one cylinder of the internal combustion engine to the stoichiometric air mass $m_{Air,stoic}$ that would be just enough to oxidize completely the fuel mass $m_{Fuel}$ fed to the at least one cylinder (stoichiometric operation of the internal combustion engine $\lambda=1$). The following applies: $\lambda=m_{Air,actual}/m_{Air,stoic}$ and, with the stoichiometric air requirement $L_{stoic}$, which is defined by $L_{stoic}=m_{Air,stoic}/m_{Fuel}$, the air ratio is given by $\lambda=m_{Air,actual}/m_{Fuel}*(1/L_{stoic})$.

Internal combustion engines are fitted with various exhaust gas aftertreatment systems to reduce pollutant emissions. In the case of spark ignition engines, catalytic reactors are employed, using catalytic materials which increase the rate of certain reactions to ensure oxidation of HC and CO, even at low temperatures. If nitrogen oxides $NO_x$ are additionally to be reduced, this can be achieved by the use of a three-way catalyst, although this utilizes stoichiometric operation ($\lambda\approx1$) of the spark ignition engine within narrow limits. In this case, the nitrogen oxides $NO_x$ are reduced by means of the available non-oxidized exhaust gas components, namely the carbon monoxides CO and the unburned hydrocarbons HC, and the exhaust gas components are simultaneously oxidized.

In the case of internal combustion engines which are operated with an excess of air, e.g. lean burn spark ignition engines and direct injection diesel engines, as well as direct injection spark ignition engines, the nitrogen oxides $NO_x$ in the exhaust gas cannot be reduced owing to the absence of reducing agents.

As a result, an exhaust gas aftertreatment system may be provided in order to reduce the nitrogen oxides, e.g. a storage catalyst, which is also referred to as an LNT (Lean NOx Trap). In this case, the nitrogen oxides are absorbed, e.g. collected and stored, in the catalyst during a lean-mixture operating mode ($\lambda>1$) of the internal combustion engine, and are then reduced during a regeneration phase with a substoichiometric operating mode ($\lambda<1$) of the internal combustion engine with a deficiency of oxygen, wherein the unburned hydrocarbons HC and the carbon monoxide CO in the exhaust gas serve as reducing agents. Further possibilities within the engine for enriching the exhaust gas with reducing agent, in particular with unburned hydrocarbons, are offered by exhaust gas recirculation (EGR) and, in the case of diesel engines, throttling in the intake section. Enrichment of the exhaust gas with unburned hydrocarbons can also be achieved by an afterinjection of fuel into at least one cylinder of the internal combustion engine. One disadvantage of the latter mentioned procedure is, in particular, dilution of the oil. It is possible to introduce hydrocarbons directly into the exhaust section, e.g. by injection of additional fuel upstream of the LNT, thereby dispensing with injection into the cylinder itself.

During the regeneration phase, the nitrogen oxides ($NO_x$) are released and are substantially converted into nitrogen dioxide ($N_2$), carbon dioxide ($CO_2$) and water ($H_2O$). The temperature of the storage catalyst may preferably be within a temperature window between 200° C. and 450° C., on the one hand ensuring rapid reduction and, on the other hand, preventing desorption without conversion of the nitrogen oxides $NO_x$ that are released again, something that can be triggered by excessive temperatures.

One difficulty in using a storage catalyst results from the sulfur contained in the exhaust gas, which is likewise absorbed and which has to be removed at regular intervals in a process referred to as desulfurization. For this purpose, the storage catalyst may be heated to high temperatures, generally between 600° C. and 700° C., and supplied with a reducing agent, e.g. unburned hydrocarbons. The high temperatures utilized for desulfurization may damage the storage catalyst, contribute to thermal aging of the catalyst and significantly reduce the desired conversion of nitrogen oxides toward the end of its life.

The storage capacity or ability to store nitrogen oxides decreases as the time in operation of the LNT increases, this being attributable to the contamination of the storage catalyst with sulfur, e.g. to the accumulation of sulfur, and also to thermal aging due to the high temperatures.

In addition to regeneration, e.g. cleaning of the LNT, which may be carried out at regular intervals, and desulfurization, the low nitrogen oxide emission limits specified by law may in future require onboard diagnosis (OBD) in order to monitor or detect the limitation in ability to function, e.g. the decrease in conversion, that can be expected as the time in operation of the LNT increases.

The technical relationships described above describe the advantages of methods for substoichiometric operation of an internal combustion engine in order to clean and desulfurize an LNT. On the other hand, however, also methods may be advantageous for monitoring the ability to function of the LNT to ensure that undesirably high pollutant emissions due to a limited ability to function or lack of conversion are reliably avoided.

Transient operating conditions make it considerably more difficult to maintain a constant air ratio and, in isolated cases, may even make it impossible since it is not possible to follow the input by the driver via the gas pedal without a delay, and especially because the operating parameters that determine the air ratio, namely the air mass and fuel quantity, can be adjusted and adapted to the new operating conditions with a delay and at different speeds.

In the range of relatively high, high and maximum loads (see FIG. 2—range 202), initiation and maintenance of a substoichiometric operating mode is generally governed by the maximum permissible exhaust gas temperature, with the exhaust gas temperature often being limited by components provided in the exhaust gas discharge system or by the thermal load bearing capacity of said components, e.g. by the turbine of an exhaust gas turbocharger, an exhaust gas aftertreatment system or the exhaust gas recirculation system. In this context, it may be taken into account that the exhaust gas temperature generally increases when the mixture is enriched.

As regards the methods for monitoring or checking the ability to function of a storage catalyst, it may be stated that these methods likewise often utilize a substoichiometric operating mode of the internal combustion engine. Here, maintaining a constant or substantially constant air ratio $\lambda$ is of decisive importance.

European Patent Application EP 1 936 140 A1 describes a method for monitoring a storage catalyst using two lambda probes, or oxygen sensors, in which a measuring error of the lambda probes is exploited. More specifically, if the unburned hydrocarbons in the exhaust gas exceed a certain concentration, the probe outputs a higher value for the air ratio $\lambda_{meas}$ than is actually present, e.g. an air ratio of $\lambda_{meas}=0.95$ as a measured variable in the case of a substoichiometric operating mode ($\lambda<1$) of the internal combustion engine and an HC concentration of 10,000 ppm in the exhaust gas, even though the air ratio is actually $\lambda_{actual}=0.85$.

To check the ability to function of the storage catalyst, the HC concentration in the exhaust gas is deliberately increased in such a way that the first probe, which is arranged upstream of the storage catalyst, operates incorrectly. If the storage catalyst is not capable of functioning properly, e.g. the storage capacity is at least limited, no more unburned hydrocarbons or less unburned hydrocarbons are oxidized by the release of nitrogen oxide $NO_x$ and the HC concentration downstream of the storage catalyst is essentially exactly the same as upstream of the storage catalyst, for which reason both lambda probes output the same value—subject to a measurement error of equal magnitude—for the air ratio. The storage catalyst is therefore assumed to be incapable of functioning properly if the air ratios $\lambda_{1,meas}$, $\lambda_{2,meas}$ determined by means of probes are of substantially equal magnitude and $\lambda_{1,meas}/\lambda_{2,meas}\approx 1$.

If, on the other hand, the storage catalyst is still capable of functioning properly, the unburned hydrocarbons in the exhaust gas are at least partially oxidized in the storage catalyst as they flow through, for which reason the HC concentration in the exhaust gas downstream of the storage catalyst will be lower than upstream of the catalyst. Thus, the storage catalyst will be assumed to be at least partially capable of functioning if the two air ratios $\lambda_{1,meas}$, $\lambda_{2,meas}$ are of different magnitudes with $\lambda_{1,meas}/\lambda_{2,meas}>1$. Here, the air ratio $\lambda_{2,meas}$ determined with the second probe, which is arranged downstream of the storage catalyst, does not necessarily have to be free from measurement error. However, the deviation of the air ratio $\lambda_{2,meas}$ from the actual air ratio $\lambda$ is at least less than upstream of the storage catalyst.

The method described in EP 1 936 140 A1 is dependent on the maintenance of a constant or substantially constant air ratio $\lambda$ and requires steady-state operation of the internal combustion engine.

The German patent application with the file reference 102012200006.2 likewise describes a method for monitoring a storage catalyst in which respective lambda probes for detecting the air ratio $\lambda$ are arranged upstream and downstream of the storage catalyst. To check the ability to function of the storage catalyst, the internal combustion engine is switched to a substoichiometric operating mode ($\lambda<1$) for a specifiable period of time, in which mode however—in contrast to the method described in EP 1 936 140 A1—both probes operate without error. The method can also be carried out in the non-steady-state operating mode of the internal combustion engine but also requires the maintenance of a constant or substantially constant air ratio $\lambda$.

The inventors recognize the aforementioned disadvantages and herein disclose systems and methods for initiating and maintaining a specifiable substoichiometric ($\lambda<1$) operating mode of an internal combustion engine in accordance with the preamble of claim 1.

The present disclosure describes systems and methods for recharging a storage catalyst of an internal combustion engine. A method, comprising: while operating an engine in a substoichiometric operating mode when the engine is under medium load and responsive to an LNT condition, assisting the engine with an electric machine connected to an engine crankshaft. The electric machine provides an auxiliary drive to assist the engine in maintaining the substantially steady state substoichiometric operating mode which may be used to reduce $NO_x$ or $SO_x$ build up in a storage catalytic convertor or to assay the condition of a storage catalytic convertor.

In the present disclosure, the exhaust gas is enriched with unburned hydrocarbons as a reducing agent by means of a substoichiometric operating mode ($\lambda<1$) of the internal combustion engine. However, further measures for enrichment may be provided.

After initiation of enrichment, the substoichiometric operating mode of the internal combustion engine, once established, with a substantially constant air ratio $\lambda$=constant is maintained by satisfying additional power demand by means of an electric machine, which can be connected to the drive train of the internal combustion engine. The electric machine may serve as selectable auxiliary drive when operating in the steady-state substoichiometric mode.

An internal combustion engine with the assistance of the electric machine may continue to operate in a steady-state mode. This ensures that the air ratio $\lambda$ does not vary due to a change in operating parameters of the internal combustion engine. Transient operating conditions, under which the air mass and the fuel quantity have to be adapted to changed boundary or operating conditions, may be avoided.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

DETAILED DESCRIPTION

The present disclosure describes a system and method to operate an internal combustion engine in a substantially steady-state substoichiometeric operating mode. An electric machine may be connected to a crankshaft of the internal combustion engine to serve as an auxiliary drive, assisting the engine in maintaining the substantially steady substoichiometric operating mode which may be utilized to regenerate exhaust gas aftertreatment systems, such as storage catalysts.

Figure 1:
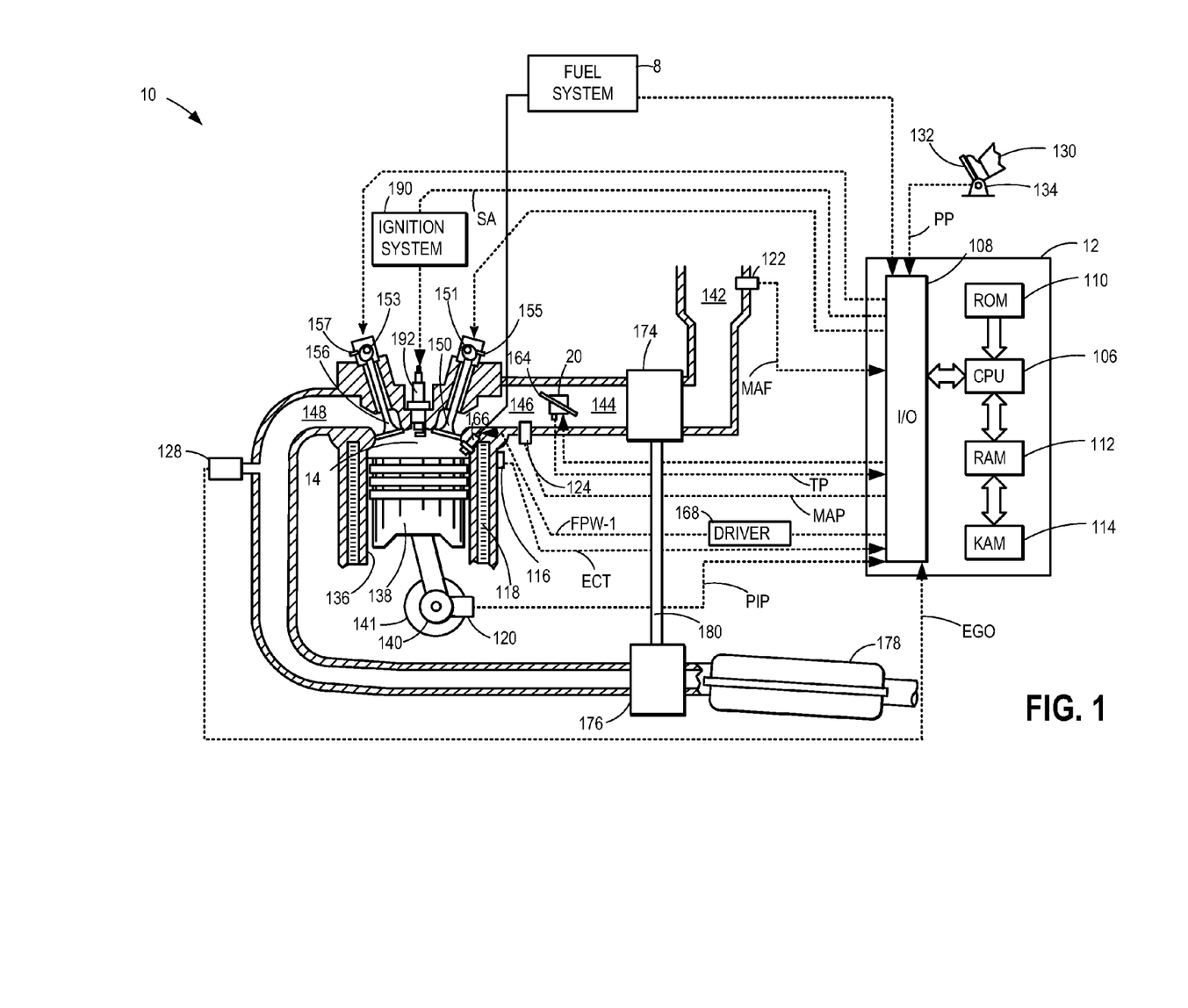
FIG. 1 is an illustration of an internal combustion engine.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

In the present disclosure crank shaft 140 may be further connected to an electric machine 141 which may assist in engine operation at certain loads under rich operating conditions. Embodiments of the method in which the electric machine which may be connected to the crank shaft to the internal combustion engine is used to absorb excess power supplied by the internal combustion engine as a selectable, generator, thus maintaining the steady-state operating mode of the internal combustion engine, are advantageous. The electric machine may be powered by a rechargeable power source, the power source recharged by the excess energy produced by the internal combustion engine. Embodiments of the internal combustion engine in which an additional battery is provided for the electric machine are advantageous. Embodiments of the internal combustion engine in which a capacitor is provided for the electric machine are also advantageous.

The electric machine may not function as an additional drive in that the electric machine may not function as a selectable auxiliary drive which feeds power into the drive train in addition to the internal combustion engine. Instead the electric machine may function as a generator, which absorbs the mechanical energy or power supplied in excess by the internal combustion engine, e.g. the excess power, and stores the energy in a battery or capacitor. The capacitor stores the energy in the form of separate electric charges and is distinguished by the possibility of a rapid discharge, e.g. the ability to supply large quantities of energy quickly.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

If the internal combustion engine is a boosted engine, additional account may be taken of the boost pressure on the intake side, which can change with the load and/or engine speed and affects the fresh air quantity and hence the exhaust gas quantity thus affecting a method of the present disclosure as discussed below herein.

In the case of an internal combustion engine which is not pressure charged, the fresh air quantity and the exhaust gas quantity corresponds approximately to the speed and/or load of the internal combustion engine, specifically in accordance with the type of load control employed in the individual case. In the case of a traditional spark ignition engine with quantity control, the exhaust gas quantity increases with increasing load, even when the engine speed is constant, whereas, in the case of traditional diesel engines with quality control, the exhaust gas quantity is exclusively dependent on the engine speed because, when there is a load change and a constant engine speed, the mixture composition but not the mixture quantity varies.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

The exhaust gas flow volume decreases with the exhaust gas temperature or with the load, irrespective of the type of load control used. Thus, a storage catalyst situated in the exhaust gas discharge system can be made smaller, e.g. dimensioned with a smaller volume, if, in accordance with the method according to the disclosure, the internal combustion engine is operated in the intermediate load range and an electric machine which may be connected to the crank shaft of the internal combustion engine is used as a selectable auxiliary drive. This may reduce costs.

The lower exhaust gas volume flows allow a storage catalyst of smaller dimensions without a reduction in the space velocity relevant to conversion. At the same time, an arrangement of the storage catalyst closer to the engine can be chosen without the exhaust gas backpressure assuming or exceeding impermissible values. This latter option has advantages especially as regards heating up of the LNT.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. A cam timing may be adjusted (by advancing or retarding the VCT system) to adjust an engine dilution in coordination with an EGR flow thereby reducing EGR transients and improving engine performance.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In the case of a spark ignition engine with direct injection as shown in FIG. 1, the air ratio λ may be adjusted by means of the quantity of fuel injected. For adjustment of the quantity of air supplied, and hence of the load, a throttle valve 20 is provided in the intake system. The throttle valve is, likewise, subject to open-loop or closed-loop control by the engine control system 12.

As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

As described above, FIG. 1 shows one cylinder of a multi-cylinder engine. As such each cylinder may similarly include its own set of intake/exhaust valves, fuel injector(s), spark plug, etc.

While not shown, it will be appreciated that engine may further include one or more exhaust gas recirculation passages for diverting at least a portion of exhaust gas from the engine exhaust to the engine intake. As such, by recirculating some exhaust gas, an engine dilution may be affected which may increase engine performance by reducing engine knock, peak cylinder combustion temperatures and pressures, throttling losses, and NOx emissions. The one or more EGR passages may include an LP-EGR passage coupled between the engine intake upstream of the turbocharger compressor and the engine exhaust downstream of the turbine, and configured to provide low pressure (LP) EGR. The one or more EGR passages may further include an HP-EGR passage coupled between the engine intake downstream of the compressor and the engine exhaust upstream of the turbine, and configured to provide high pressure (HP) EGR. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Controller 12 is shown in FIG. 1 as a microcomputer, including microprocessor unit 106, input/output ports 108, an electronic storage medium for executable programs and calibration values shown as read-only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

Figure 2:
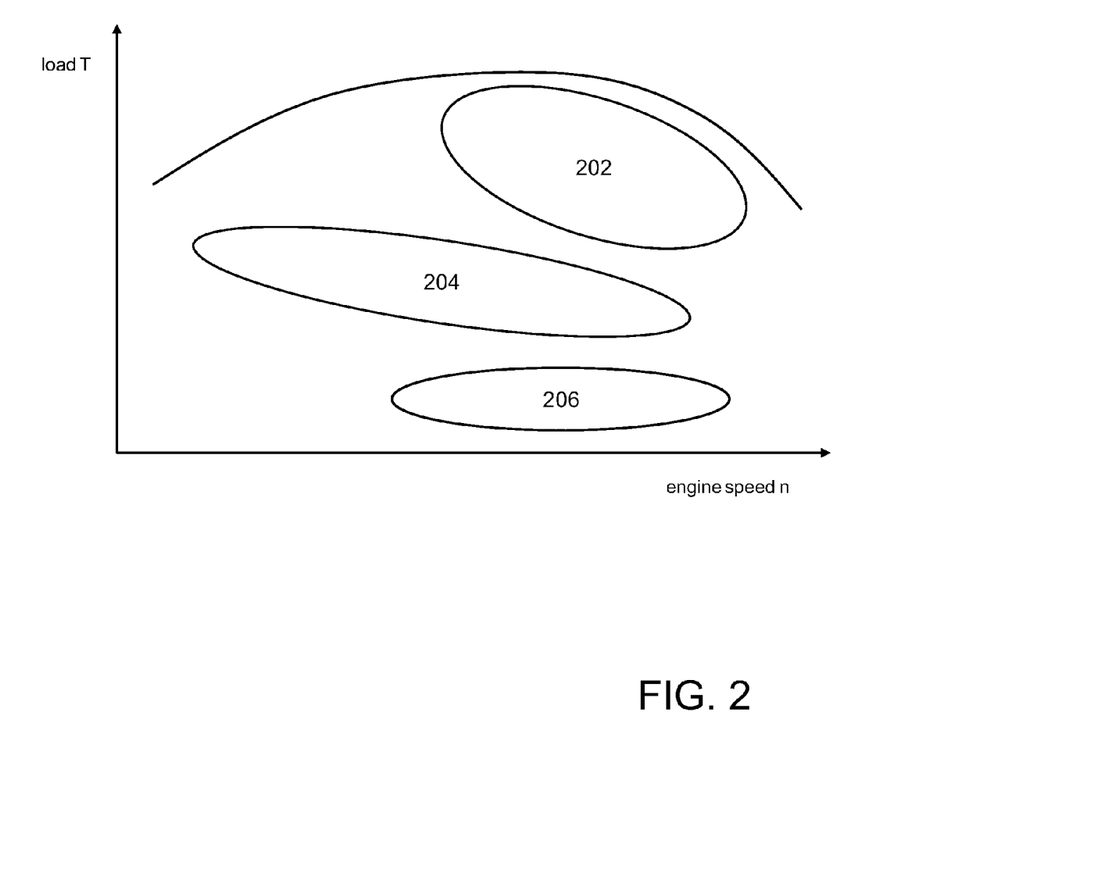
FIG. 2 diagrams the load T against the engine speed n of a first embodiment of the internal combustion engine in the form of a diagram.

FIG. 2 shows the load T plotted against the engine speed n of a first embodiment of the internal combustion engine in the form of a diagram, e.g. what is referred to as an engine map. The full load characteristic and the various load ranges are plotted in FIG. 2.

In accordance with the disclosure, the substoichiometric operating mode of the internal combustion engine ($\lambda_{constant}$<1) is implemented selectively in the intermediate load range, in which the initiation and maintenance of a reproducible stable combustion process may be unproblematic. Another significant advantage of rich-mixture operation in the intermediate load range results from the exhaust gas temperatures, which decrease from the range of relatively high loads to relatively low loads. The low exhaust gas temperatures in the intermediate load range enable the substoichiometric operating mode to be maintained for longer, thus allowing prolonged cleaning or desulfurization of the LNT, and allowing sufficient time to carry out checking of functionality.

The intermediate load range 204, in which stable combustion may be produced, even when the internal combustion engine is being operated on a rich mixture, is nevertheless characterized by transient operating conditions.

The relatively low load range 206, in which initiating and maintaining rich-mixture operation with stable combustion may problems.

The range of relatively high, high and maximum loads 202, in which the substoichiometric operating mode may be restricted by the maximum permissible exhaust gas temperature.

In a non-limiting example however a substoichiometric operating mode may be enacted under a high low or medium load condition. In this example, the substoichiometric operating mode may occur without the assistance of the electric machine.

The engine map illustrated in FIG. 2 is intended to give a basic illustration of the three load ranges, medium load range is relative to the maximal load range of a particular engine in proportions described herein below.

In the relatively low load range operating mode may be initiated and maintained with difficulty since stable combustion cannot be ensured (see FIG. 2 range 206). This may give rise to problems especially in the case of diesel engines, the operating method of which is based on compression ignition. There may be ignition failures or incomplete combustion of the mixture. The result may be undesirably high pollutant emissions, especially those of unburned hydrocarbons HC.

In the intermediate load range, the stability of combustion may pose fewer or no problems (see FIG. 2 range 204). However, the intermediate load range may generally be an operating range of the internal combustion engine in which there are frequent load changes due to acceleration or deceleration of the vehicle while driving, and hence is a non-steady-state operating range. Here, the change in load results from an additional power demand by the driver or excess power which is supplied by the internal combustion engine. Ascents or descents, a change in the rolling resistance or a change in the strength and/or direction of the relative wind may also cause such a change in load.

In the intermediate load range, the exhaust gas quantities which arise are often less than in the high and maximum load ranges. The associated exhaust gas volume flows are generally lower since the exhaust gas temperatures decrease at the transition from high loads to intermediate loads and, with the temperatures, the volume flows likewise decrease owing to the increased density.

If the internal combustion engine according to the disclosure is based on quantity control, then, as the load falls, the exhaust gas quantity likewise decreases. If the internal combustion engine is operated in the intermediate load range, the exhaust gas quantities are smaller than in the case of relatively high loads.

If, on the other hand, the internal combustion engine is based on quality control, in which the load is controlled by way of the composition of the mixture and the exhaust gas quantity changes almost exclusively with the engine speed, the exhaust gas quantity does not change with the load at a constant engine speed. This notwithstanding, switching the internal combustion engine to the intermediate load range may lead to a smaller exhaust gas quantity if the speed of the internal combustion engine decreases at the same time.

In the range of relatively high, high and maximum loads (see FIG. 2—range 202), initiation and maintenance of a substoichiometric operating mode is generally governed by the maximum permissible exhaust gas temperature, with the exhaust gas temperature often being limited by components provided in the exhaust gas discharge system or by the thermal load bearing capacity of the components, e.g. by the turbine of an exhaust gas turbocharger, an exhaust gas aftertreatment system or the exhaust gas recirculation system. In this context, it may be taken into account that the exhaust gas temperature may increase when the mixture is enriched.

Figure 3:
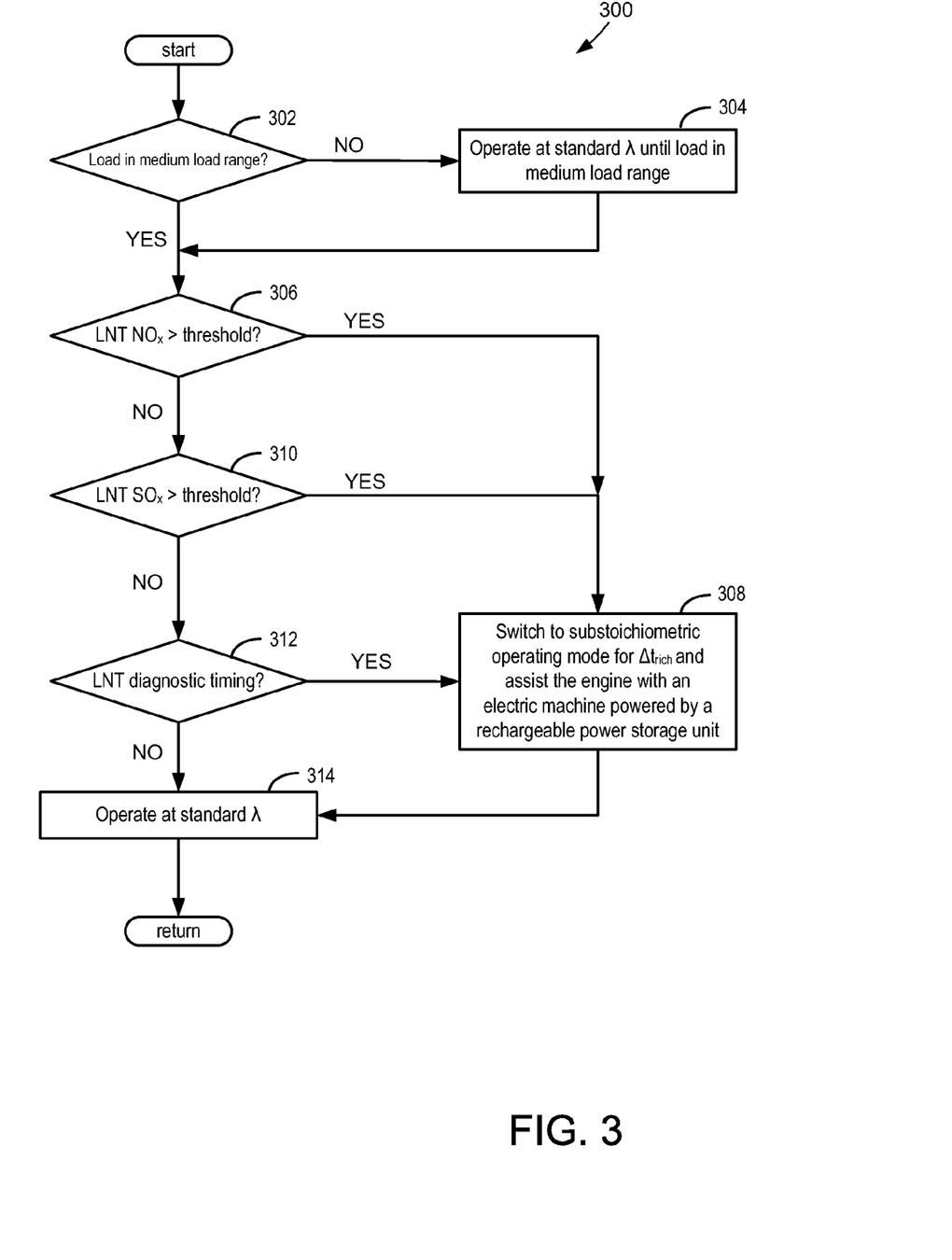
FIG. 3 is a high level flowchart depicting a method in accordance with the present disclosure.

Referring now to FIG. 3, a flowchart depicting a method 300 in accordance with the present disclosure is shown. The method may be stored in read-only memory 110 and enacted by engine controller 12.

The method 300 starts with an engine key on event. The method then proceeds to 302 where it is assessed if engine load is in the medium load range. If NO at 302, the method proceeds to 304 where a standard operating air ratio $\lambda$ is maintained until the engine load is in the medium load range. If at 302, the engine load is within the medium load range (YES) the method then proceeds to assessing various conditions of the storage catalytic convertor.

At 306, it is determined if $NO_x$ levels in the LNT storage catalytic convertor are above threshold levels. If YES at 306, the method then proceeds to 308 where the engine is switched to a substoichiometric operating mode for a period of time, $\Delta t_{rich}$. If at 306, $NO_x$ levels are not below threshold (NO) the method then proceeds to 310.

At 310, it is determined if $SO_x$ levels in the LNT storage catalytic convertor are above threshold levels. If YES at 310 the method then proceeds to 308 where the engine is switched to a substoichiometric operating mode for a period of time, $\Delta t_{rich}$. If at 310, $SO_x$ levels are not below threshold (NO) the method then proceeds to 312.

At 312, it is determined if it is time for a diagnostic check of the LNT storage catalytic convertor. If YES at 312, the method then proceeds to 308 where the engine is switched to a substoichiometric operating mode for a period of time, $\Delta t_{rich}$. If at 312, it is not the timing for a a diagnostic check of the LNT storage catalytic convertor the method proceeds to 314 where standard air ratio $\lambda$ is maintained.

The timing for a diagnostic test may be based on operating conditions, such as AFR and engine speed in addition to being performed at medium engine loads. Alternatively, the diagnostic test may be performed at regular intervals of distance covered, time elapsed, or on timing since last substoichiometric operating mode.

While the engine is operating in a substoichiometric operating mode the electrical machine connected to the crank shaft is assisting the engine using power stored in a battery or capacitor. The assistance by the electric machine may be proportional to a degree of richness of the air-fuel ratio in a substoichiometric operating mode. In one example, the electric machine may assist the engine to a higher degree under more rich operation and to a lesser degree when the substoichiometric operating mode uses a less rich mixture. In another example, the assistance of the electric machine may be inversely proportional such that the electric machine assists to a lesser degree as the engine is operated at a higher degree of richness and the electric machines assists to a higher degree when the engine is operated at a less rich air-fuel ratio.

At 308 after $\Delta t_{rich}$ has elapsed the method then proceeds to 314 where the engine reverts to standard air ratio $\lambda$ operating mode. Once the substoichiometric operating mode is ended, assistance by the electric machine may also end. The method then returns.

The period of time $\Delta t_{rich}$ over which the substoichiometric operating mode of the internal combustion engine is maintained depends on the measure to be carried out. For example, whether an LNT arranged in the exhaust gas discharge system is to be cleaned, desulfurized or checked for its ability to function.

As regards the methods for monitoring or checking the ability to function of a storage catalyst maintaining a constant or substantially constant air ratio $\lambda$ is advantageous.

In accordance with the method according to the disclosure, the internal combustion engine is switched to a substantially steady-state operating mode, e.g. a substoichiometric operating mode of the internal combustion engine with a substantially constant air ratio $\lambda$. The word substantially is used with reference to the steady state operating mode as minor variances in air ratio $\lambda$ may be expected.

Embodiments of the method in which the internal combustion engine is switched to a substoichiometric steady-state operating mode where $\lambda_{constant}<1$ in the intermediate load range are advantageous.

A slight enrichment may be preferable to heavy enrichment since the introduction of excess fuel may be disadvantageous both in terms of energy considerations, especially as regards the fuel consumption of the internal combustion engine, and in view of pollutant emissions.

Embodiments of the method in which the internal combustion engine is switched to a substoichiometric operating mode where $1>\lambda_{constant}>0.9$ are advantageous.

Embodiments of the method in which the internal combustion engine is switched to a substoichiometric operating mode where $1>\lambda_{constant}>0.95$ are also advantageous.

Embodiments of the method in which the internal combustion engine is switched to a substoichiometric operating mode where $0.97>\lambda_{constant}>0.93$ are especially advantageous.

The air ratio $\lambda$ for the substoichiometric operation of the internal combustion engine varies to maintain engine components. On the one hand, the enrichment performed may be as small as possible since the disadvantages of enrichment are positively correlated with increasing enrichment. On the other hand, the exhaust gas may be enriched to such an extent with incompletely oxidized combustion products, in particular unburned hydrocarbons, that the set goal is achieved.

In an embodiment where a storage catalyst is arranged in the exhaust gas discharge system, the air ratio $\lambda$ is partially determined by whether the LNT is to be cleaned, desulfurized or checked for its ability to function.

Embodiments of the method in which the internal combustion engine is switched to a substoichiometric operating mode for a period of time $\Delta t_{rich}<45$ seconds can be advantageous.

Embodiments of the method in which the internal combustion engine is switched to a substoichiometric operating mode for a period of time $\Delta t_{rich}<15$ seconds can also be advantageous.

Embodiments of the method in which the internal combustion engine is switched to a substoichiometric operating mode for a period of time $\Delta t_{rich}<2$ seconds, in order to check the ability to function of the storage catalyst for example, are especially advantageous.

For the definition of the duration of enrichment, namely the period of time $\Delta t_{rich}$, what has already been stated above in connection with the degree of enrichment applies in a similar manner. On the one hand, enrichment may be as short as possible so that the disadvantages of enrichment are minimized. On the other hand, enrichment may last or be carried out for long enough to achieve the set goal.

Embodiments of the method in which the intermediate load range in which the internal combustion engine is switched to the substantially steady-state operating mode encompasses loads $T_{mid}$ between 20% and 80% of the maximum load $T_{max,n}$ at the prevailing engine speed n are advantageous.

Embodiments of the method in which the intermediate load range in which the internal combustion engine is switched to the substantially steady-state operating mode encompasses loads $T_{mid}$ between 30% and 70% of the maximum load $T_{max,n}$ at the prevailing engine speed n are especially advantageous.

Embodiments of the method in which the intermediate load range in which the internal combustion engine is switched to the substantially steady-state operating mode encompasses loads $T_{mid}$ between 40% and 60% of the maximum load $T_{max,n}$ at the prevailing engine speed n are also advantageous.

In the case of internal combustion engines which have a storage catalyst as an exhaust gas aftertreatment system in the exhaust gas discharge system, embodiments of the method in which the internal combustion engine is switched to the substoichiometric operating mode ($\lambda_{constant}<1$) in order to regenerate the storage catalyst are advantageous.

In the case of internal combustion engines which have a storage catalyst as an exhaust gas aftertreatment system in the exhaust gas discharge system, embodiments of the method in which the internal combustion engine is switched to the substoichiometric operating mode ($\lambda_{constant}<1$) in order to desulfurize the storage catalyst are also advantageous.

In the case of internal combustion engines which have a storage catalyst as an exhaust gas aftertreatment system in the exhaust gas discharge system, embodiments of the method in which the internal combustion engine is switched to the substoichiometric operating mode ($\lambda_{constant}<1$) in order to check the lack of ability to function of the storage catalyst are also advantageous.

In checking the lack of ability to function of the LNT, use is generally made of the fact that little or none of the unburned hydrocarbons in the exhaust gas are oxidized by the release of nitrogen oxides $NO_x$ as they flow through a storage catalyst with a limited ability to function, for which reason the HC concentration in the exhaust gas changes a small extent, if at all. The release of nitrogen oxides in the storage catalyst and the associated oxidation processes change an air ratio $\lambda$ determined metrologically downstream of the LNT.

Embodiments of the method in which the internal combustion engine is switched to a specifiable operating point in the intermediate load range before the internal combustion engine is switched to the substoichiometric operating mode ($\lambda<1$) are advantageous.

Since not all operating points in the intermediate load range are equally well suited to the substoichiometric operating mode of the internal combustion engine, it is expedient and advantageous to select or provide a limited number of operating points in the intermediate load range for carrying out the method in order to avoid the storage of parameters for a rich-mixture operating mode in the engine control system for all points in the intermediate load range on the characteristic map.

Variants of the method in which the specified operating point is selected from a limited list of k operating points are advantageous in this context.

Embodiments of the method in which the air ratio $\lambda$ is reduced by increasing the quantity of fuel injected in order to switch the internal combustion engine to the substoichiometric operating mode are advantageous.

In principle, the air ratio $\lambda$ could also be reduced by reducing the air mass supplied. However, the disadvantage of such a procedure is that, by virtue of the principle involved, a loss of power is associated with the reduction in the air mass. It is therefore preferable to reduce the air ratio $\lambda$ by increasing the quantity of fuel injected in accordance with the embodiment under discussion.

The present disclosure describes systems and methods for recharging a storage catalyst of an internal combustion engine. A method is disclosed, comprising: while operating an engine in a substoichiometric operating mode when the engine is under medium load and responsive to an LNT condition, assisting the engine with an electric machine connected to an engine crankshaft. The electric machine provides an auxiliary drive to assist the engine in maintaining the substantially steady state substoichiometric operating mode. This operating mode may be used to reduce $NO_x$ or $SO_x$ build up in a storage catalytic convertor or to assay the condition of a storage catalytic convertor. Use of a substoichiometric operating mode of the present disclosure may reduce emissions.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   switching an internal combustion engine to a substoichiometric operating mode for a specifiable period of time
   maintaining the substoichiometric operating mode of the internal combustion engine with a constant air ratio, wherein
   the internal combustion engine has an exhaust gas discharge system for discharging exhaust gases and at least one exhaust gas aftertreatment system arranged in the exhaust gas discharge system;
   wherein the internal combustion engine is switched to a substoichiometric steady-state operating mode in an intermediate load range comprising loads between 40% and 60% of a maximum load at the prevailing engine speed; and
   connecting an electric machine to a crankshaft of the internal combustion engine to be used as a selectable auxiliary drive, when operating the internal combustion engine in the substoichiometric steady-state operating mode.

2. The method as claimed in claim 1, wherein the internal combustion engine is switched to the substoichiometric steady-state operating mode where $\lambda<1$ in the intermediate load range.

3. The method as claimed in claim 1, wherein the internal combustion engine is switched to the substoichiometric steady-state operating mode where $1>\lambda>0.9$.

4. The method as claimed in claim 1, wherein the internal combustion engine is switched to the substoichiometric steady-state operating mode where $1>\lambda>0.95$.

5. The method as claimed in claim 1, wherein the internal combustion engine is switched to the substoichiometric steady-state operating mode where $0.97>\lambda>0.93$.

6. The method as claimed in claim 1, wherein the electric machine absorbs excess power supplied by the internal combustion engine as a selectable generator.

7. The method as claimed in claim 1, further comprising switching the internal combustion engine to a specifiable operating point in the intermediate load range before the internal combustion engine is switched to the substoichiometric steady-state operating mode.

8. The method as claimed in claim 7, wherein the specifiable operating point is selected from a limited list of operating points.

9. The method as claimed in claim 1, wherein initiating a substoichiometric steady-state operating mode is achieved by reducing $\lambda$ by increasing a quantity of fuel injected.

10. The method as claimed in claim 1, wherein the specifiable period of time is less than 45 seconds.

11. The method as claimed in claim 1, wherein the specifiable period of time is less than 15 seconds.

12. The method as claimed in claim 1, wherein the specifiable period of time is less than two seconds.

13. An internal combustion engine, comprising:
    an exhaust gas discharge system;
    at least one exhaust gas aftertreatment system arranged in the exhaust gas discharge system, the exhaust gas aftertreatment system including an LNT storage catalytic convertor;

an electric machine connected to a crankshaft of the internal combustion engine, the electric machine serving as a selectable auxiliary drive for power output and as a generator for power absorption; and a controller including non-transitory instructions executable to: while the engine is operating in a substoichiometric operating mode and the engine is under medium load, assisting the engine with the electric machine responsive to a duration since a last diagnostic test of the LNT storage catalytic convertor.

\* \* \* \* \*